United States Patent [19]

Lewis

[11] Patent Number: 5,296,865
[45] Date of Patent: Mar. 22, 1994

[54] MTI COMPATIBLE COHERENT SIDELOBE CANCELLER

[75] Inventor: Bernard L. Lewis, Oxon Hill, Md.

[73] Assignee: The United States of America as represented by the Secretary of the Navy, Washington, D.C.

[21] Appl. No.: 499,962

[22] Filed: Aug. 23, 1974

[51] Int. Cl.$^5$ .......................... G01S 3/16; G01S 3/28
[52] U.S. Cl. .................................. 342/384; 342/381
[58] Field of Search .................. 343/100 LE, 100 CL; 325/323, 371; 342/381, 384

[56] References Cited

U.S. PATENT DOCUMENTS 2,938,206  5/1960  Davis et al. .................. 343/100 LE
3,202,990  8/1965  Howells ....................... 343/100 LE

*Primary Examiner*—Theodore M. Blum
*Attorney, Agent, or Firm*—Thomas E. McDonnell

[57] ABSTRACT

A system for instrumenting time sampled interference suppression, particularly in a side-lobe canceller system. Interference signals are sampled just before a radar transmits on command of a sample gate or radar pulse, with main and auxiliary channel signals being delayed by the time between two successive samples. The two samples are then combined to allow interpolation such that weighting functions can be formed to adjust the delayed auxiliary signal so that interference in the delayed main channel signal can be suppressed at all times. By sampling just prior to radar transmission and interpolating between samples, cross modulation of clutter, and antenna scan error can be reduced in order that a side-lobe canceller system may be used compatibly with Moving Target Indicators (MTI).

10 Claims, 2 Drawing Sheets

MTI COMPATIBLE COHERENT SIDELOBE CANCELLER

BACKGROUND OF THE INVENTION

The present invention relates to interference suppression systems and more particularly to side-lobe canceller systems which are compatible with MTI.

Generally, interference suppression systems of the prior art are designed to reduce the presence of undesired signals in a signal receiving system. As is known, in particular systems, such as a radar system, the characteristics of the receiving antennas are such that undesired signals which are received in the side-lobes interfere with the isolation of the target signal received in the main lobe. Accordingly, to isolate the main lobe signals, side-lobe cancellers have been used to cancel interference in the side-lobe of the main radar antenna as exampled by the Paul W. Howells U.S. Pat. No. 3,202,990.

It has been found that while conventional side-lobe canceller systems are highly successful in most instances, problems arise when the system is used to cancel interference in a high clutter environment where normally Moving Target Indicators (MTI) can be used to cancel the clutter. An MTI relies on the clutter return being the same on a pulse to pulse basis in order to allow distinction from a target return which varies due to target movement between radar pulses. When clutter is present simultaneously with jamming interference, however, it has been found that conventional side-lobe cancellers modify the clutter on a pulse to pulse basis because of a cross modulation between the clutter and interference signals. As the clutter returns are not the same, an MTI cannot be used thereby preventing clutter cancellation and prohibiting the use of a side-lobe canceller with the MTI.

It has been proposed that one way to avoid clutter modification with side-lobe cancellers is to sample the interference signal just prior to the transmission of a radar pulse when clutter is weak or non-existent. While in theory such sampling would allow the derivation of side-lobe cancelling signals without clutter modification, it would also introduce a time dependent unbalance in the cancelling signals due to the antenna scan between sampling pulses. In practice, systems for implementing such sampling and cancelling still remain undeveloped with the result being that there is presently no available system for allowing effective and compatible use of a side-lobe canceller system with an MTI.

Accordingly, the present invention has been developed to overcome the specific shortcomings of the above known and similar techniques and to provide a system for producing reliable interference cancellation in a high clutter environment.

SUMMARY OF THE INVENTION

It is therefore an object of the present invention to provide an improved interference cancelling system which is simple to implement yet highly reliable in operation.

Another object of the invention is to provide a side-lobe canceller system that can operate in a high clutter environment.

A further object of the invention is to provide a side-lobe canceller that can be compatibly used with Moving Target Indicators.

Still another object of the invention is to provide an improved side-lobe canceller system for operating with samples of an interference environment.

A still further the invention is to provide a sampling side-lobe canceller system which prevents time dependent imbalance in cancelling signals due to main antenna scan between samples.

In order to accomplish the above and other objects, the invention provides a unique sampling canceller to eliminate clutter modification while producing effective interference cancelling signals. A canceller loop, receiving a main and auxiliary channel signal, is constructed to provide a sample and hold circuit in the phase and amplitude correlating circuits of the loop. The loop weight is sampled by means of a radar pretrigger or sample gate pulse to provide a weighting function during a time period just prior to transmission of a radar pulse where clutter returns are weak or non-existent. At the same time, a second canceller loop receives the main and auxiliary channel signals delayed by the time between radar pulses. The second canceller loop operates in the same manner as the first canceller loop to provide a weighting function at the second loop delayed in time from the first weighting function by the time between radar pulses. Weighting functions from the first and second loops are then combined and adjusted to provide an interpolated signal weight which is mixed with the delayed auxiliary signal to produce a cancelling signal. This cancelling signal is then subtracted from the delayed main channel signal to reduce the main channel interference. Since the weighting functions are derived during a time period where clutter is substantially absent, the cancelling signals can be used without the presence of cross modulated clutter. In addition, since the adjusted weighting function is an interpolated value between two samples, the weighting function is linearly modified to compensate for antenna scan over the time between radar pulses. The total effect is to produce a main channel signal with jamming interference substantially eliminated and a clutter signal that is unmodified by the operation of the side-lobe canceller, thereby allowing use with an MTI.

Other objects, advantages, and novel features of the invention will become apparent from the following detailed description of the invention when considered with the accompanying drawings wherein:

DETAILED DESCRIPTION OF THE PREFERRED EMBODIMENT

Figure 1:
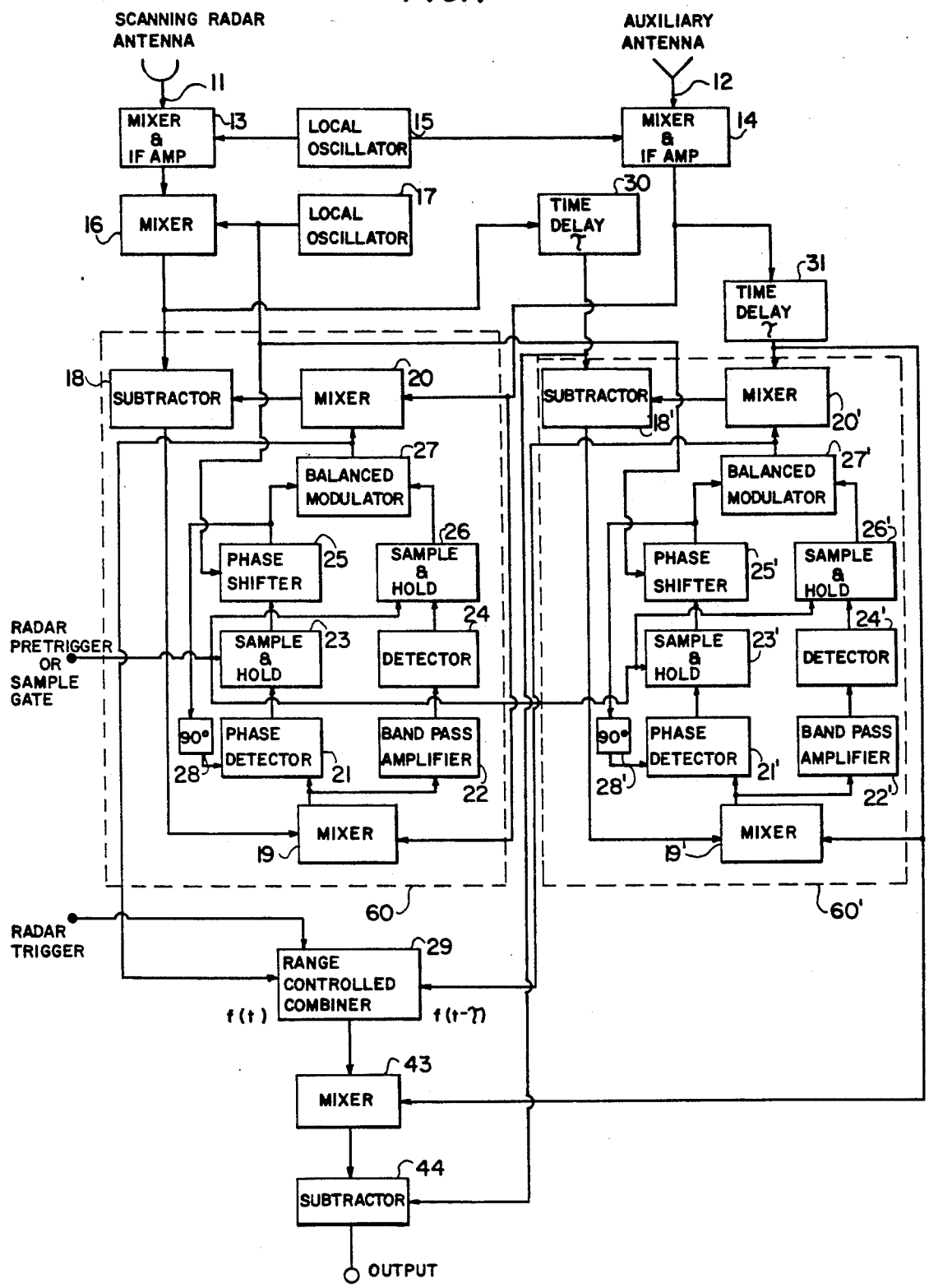
FIG. 1 is a schematic diagram showing a preferred embodiment of the canceller system according to the present invention.

Referring now to FIG. 1, a schematic diagram represents a preferred embodiment of a side-lobe canceller system according to the present invention. In the present example, an intermediate frequency (IF) side-lobe canceller in a scanning radar system will be described although the inventive teachings are equally applicable to other types of canceller systems. Generally, the system includes a main receiving channel in the form of a directional radar antenna 11 and an auxiliary receiving channel in the form of an omnidirectional antenna 12. While the system being described only refers to the main antenna as a receiving antenna, the antenna can just as well act to both transmit and receive in the conventional manner. The main radar antenna 11 forms the main channel for receiving radar signals in the main lobe and any interference that may be present in the side-lobes. The auxiliary antenna 12 receives primarily undesired interference as samples of the environment in which the radar is attempting to operate. Signals from antenna 11 are mixed with the output of local oscillator 15 down to an intermediate frequency in a combined mixer and IF amplifier circuit 13 of conventional construction. In the same manner, signals from auxiliary antenna 12 are mixed with the output of local oscillator 15 down to the same intermediate frequency output of 13, in a similar combined mixer and IF amplifier circuit 14. The output of 13 is then mixed with the output of local oscillator 17 in a mixer 16 to translate the IF frequency output of 13 up or down by an amount greater than the IF bandwidth of the IF amplifiers of circuits 13 and 14. The output from 16, constituting the main channel signal, is then coupled to a canceller loop generally shown at 60 along with the output from 14 constituting the auxiliary channel signal. The same outputs from 16 and 14 are additionally coupled through time delays 30 and 31 respectively, each having the same time delay $\tau$ equal to the time period between radar pulses, to form inputs to a second canceller loop 60' as shown. Both canceller loops are identical in construction with elements 18–28 of canceller loop 60 corresponding to elements 18'–28' of canceller loop 60'. A description of canceller loop 60 will therefore apply to the corresponding elements of canceller loop 60'.

Canceller loop 60 basically comprises a subtractor 18 coupled to receive the main channel input from 16. The output of the subtractor is coupled as a first input to mixer 19 and mixed with a second input from auxiliary channel 14. The mixer 19 after receiving the translated main IF signal from subtractor 18, and the auxiliary IF signal from 14, provides a resultant signal center frequency equal to that of the signal out of local oscillator 17. At this point the output from mixer 19 is divided into two branches to control the phase and amplitude of the signal input to mixer 20. In one branch the output from 19 is compared in a conventional phase detector 21 with the output from local oscillator 17. The output from phase detector 21 is coupled to a sample and hold circuit 23 which in turn is coupled to one input of a conventional phase shifter 25. Circuit 23 is a conventional sample and hold circuit which samples the output from phase detector 21 during the time that a pulse is present from the radar pretrigger or sample gate and holds the output present at the end of such pulse until a new pulse is received. Local oscillator 17 is coupled to a second input of phase shifter 25 while the output from 25 is coupled back through a conventional 90° phase shifter to a second input to phase detector 21. The signal output from phase shifter 25 is the local oscillator signal from 17 phase shifted by the signal from 21 through circuit 23. The output from phase detector 21, via circuit 23, adjusts the phase of the local oscillator signal from 17 into phase detector 21, via phase shifter 25 and 90° phase shifter 28, to null the output of phase detector 21. This phase locks the output of phase shifter 25 to the signal out of mixer 19 during the sample time defined by the radar pretrigger or sample gate pulse length.

In the second branch of loop 60, the output from 19 is coupled to bandpass amplifier 22, having a center frequency of the translated signal out of mixer 19, and then to detector 24. Detector 24 is an amplitude detector and may be any conventional device such as a diode rectifier which provides a DC output proportional to the amplitude of the modulated signal out of mixer 19. The output from detector 24 is then passed through sample and hold circuit 26 which is of the same construction as 23, and connected to receive the same radar pretrigger or sample gate pulse. The output from 26 is then combined with the output from phase shifter 25 in balanced modulator 27 whose output magnitude is proportional to the amplitude of the output of mixer 19 and whose frequency corresponds to that out of local oscillator 17 adjusted in phase by the output of 19. The output from balanced modulator 27 is then combined with the auxiliary signal from 14 in mixer 20, and translates the auxiliary signal up or down, dependent upon whether mixer 16 translated up or down. The signal output from 20 has a magnitude proportional to the output of the balanced modulator 27 so long as the gain of the auxiliary antenna and circuit 14 is greater on the interference signal in the auxiliary channel than the gain of the main antenna and circuit 13 on the corresponding interference signal in the main channel. In practice, this is insured by making the gain of the auxiliary channel about twice that of the main channel on the highest side-lobe of the main channel antenna. In addition, the interference signal out of mixer 20 will be in phase with the corresponding signal in the main channel input to subtractor 18 independent of phase center differences in the main and auxiliary antennas.

As was previously noted, the construction and operation of canceller loop 60' is the same as that described in loop 60 except that loop 60' operates on main and auxiliary signals delayed by a time $\tau$. The result of such operations of both loops is to produce weighting functions at the output of modulators 27 and 27' with the output from 27 representing the function f(t) and the output of modulator 27' being an output delayed by $\tau$ or $f(t-\tau)$. These outputs are combined in a range controlled combining circuit 29 which receives a pulse representing radar trigger as shown, and produces an instantaneous output weighting function corresponding to a linear interpolation between the two functions. This function is then used in a conventional side-lobe canceller loop including mixer 43 and subtractor 44. The function out of 29 is combined in mixer 43 to translate the delayed auxiliary IF signal from 31 so that it will subtract from the delayed main channel signal in subtractor 44 to cancel interference in the main channel output.

Figure 2:
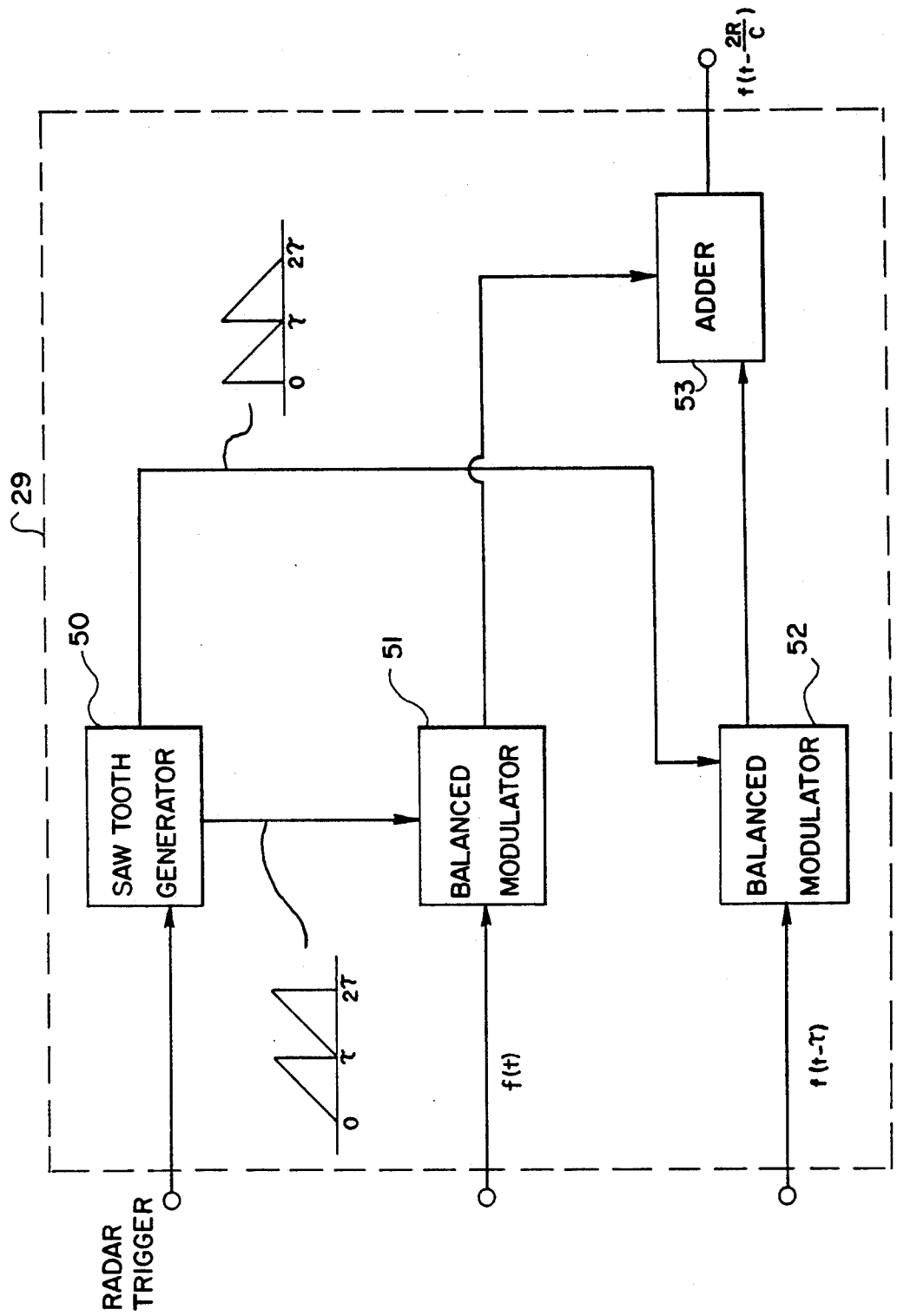
FIG. 2 is a schematic diagram showing the construction of the circuit for developing the weighting function in FIG. 1.

Turning now to FIG. 2, the elements forming the range controlled combiner 29 are schematically shown. Generally, the circuit 29 comprises a sawtooth generator 50, balanced modulators 51 and 52, and adder 53. Signals f(t) and $f(t-\tau)$ are received from modulators 27 and 27' as inputs to balanced modulators 51 and 52 respectively. A pulse representing the radar trigger (pulse initiating radar pulse transmission) is provided as input to generator 50 which is coupled to provide two outputs, one to each modulator 51 and 52. The output of 50 consists of two portions of the sawtooth representing repetitive ramp signals, one delayed by 90° from the other. Both signals are initiated by the presence of a radar trigger pulse. The signal input to 51 is that portion of the sawtooth waveform that forms a linear ramp upsweep of such magnitude as to cause the output from balanced modulator 51 to be zero at time t=0 and f(t) (or unity gain) at time $\tau$. The signal input to 52, on the other hand, is that portion of the sawtooth waveform that forms a linear ramp downsweep of such magnitude as to cause the output from balanced modulator 52 to be f(t−τ) (or unity gain) at time t=0 and zero at time τ. Each ramp is repetitively initiated by the radar trigger pulses to form repetitive ramps over the period τ as shown in the drawings. The outputs are then vectorily added in adder 53 to produce an output which is f(t−τ) at time t−τ and f(t) at time t. In between those times the output from 53 is a combination of the two signals properly weighted to form a straight line interpolation as a function of time, e.g.

$$f\left(t - \frac{2R}{c}\right)$$

where R equals target range in distance and c equals the speed of light and where t−τ≦

$$t - \frac{2R}{c} \leq t,$$

with τ representing the time equal to the period between successive radar pulses.

The operation of the system will now be described with reference to FIG. 1 and, as can be seen, is similar in many respects to conventional side-lobe cancellers. Where an interference (jammer) source is present in the vicinity of a radar, main channel 11 will receive radar signals (target returns) represented by radar signal carriers modulated by the radar signal, and an interference (jammer) carrier having the same frequency, but different amplitude and phase, modulated by the jammer waveform. At the same time, auxiliary antenna 12 will receive primarily interference signals corresponding to those received by the main radar antenna except for a gain difference and a phase shift introduced by the difference in path length from the jammer to the auxiliary antenna and from the jammer to the radar antenna. As is known, if the radar is operating in a high clutter environment the radar signal will also include clutter returns which are generally distinguishable from moving target returns due to their constant character on a pulse to pulse basis. The main channel signal, after passing through elements 13 and 16 is combined in a canceller loop 60 in a manner designed to cancel interference signals from a jamming source and provide a main radar output. The loop 60 uses the main channel signal to translate the auxiliary channel signal in mixer 19 to correlate the interference signal in each channel and produce a weighting function at the output of 27 which adjusts the phase and amplitude of the auxiliary signal in mixer 20 to provide a signal for cancelling the main channel interference. The output from mixer 20 is subtracted from the output of mixer 16 in subtractor 18 and the difference signal drives the mixer 19 to further suppress the interference signal out of subtractor 18. In essence, the feedback loop adjusts the phase and amplitude of the interference signal out of mixer 20 to cancel the interference in the main channel output to subtractor 18, in the manner as has been previously described. In a like manner, the main channel input and auxiliary channel input to subtractor 18' are combined in canceller loop 60' to cancel the interference in the delayed main channel signal, except for a time delay τ representing a time period equal to the radar pulse period. In both loops, the speed of response of the loops will be proportional to loop gain which in turn will be proportional to average power input from the main channel signal. The loops will, therefore, tend to cancel signals such as jammer signals having high average power, while being relatively insensitive to signals such as radar target returns.

Up to this point the canceller loops 60 and 60' have operated similar to conventional side-lobe canceller loops in suppressing high duty cycle interference while passing the radar target returns. It was recognized, however, that if clutter returns were present in the main channel, the conventional canceller loops would tend to cross modulate clutter and interference signals which would result in a modification of the clutter returns from one radar pulse to the next. This fact prevented conventional systems from being used with an MTI which requires the clutter return to be the same from one pulse to the next as has been previously noted. According to the present invention, therefore, the weighting function from the canceller loop is sampled during a time period when the clutter is weak or non-existent and then used to cancel jamming signals in the main radar signal having unmodified clutter returns. This is implemented by providing a radar pretrigger signal during a period of time immediately preceeding the radar pulse, where as is known, clutter returns are very weak or non-existent. This pretrigger pulse serves to control a sample and hold circuit through elements 23 and 26 which develops a weighting function at the output of 27 while the pretrigger pulse is present, and holds that weighting function after the pretrigger pulse ends until the next pretrigger pulse is received. In practice, the pretrigger pulse may be present, by way of example, for a time period of between 10 and 100 μsec prior to each radar pulse in radar systems with radar pulses generally occurring every 3 milliseconds.

If this sample were then used to cancel the jamming signals in the main channel over the entire pulse period (which is defined as the time from the leading edge of one radar pulse to the leading edge of the next succeeding radar pulse), the interference would be ineffectively reduced because of the difference in interference present in the main channel at the beginning of each radar pulse period from that present at the end of each pulse period due to the antenna scan during that period. Accordingly, the present invention delays the main and auxiliary signals through delays 30 and 31 by a time equal to the period between each radar pulse, and provides a weighting function in loop 60' in the same manner as loop 60. The effect is to produce a weighting function at the beginning of each pulse period at the output of balanced modulators 27 and 27' that represents the end limits of the weighting function needed for cancelling over any pulse period. The function f(t) represents the weighting function at the end of a previous pulse period, while f(t−τ) represents the weighting function at the beginning of the previous pulse period. As has been previously disclosed, these two values are combined at 29 to produce a linearly interpolated weighting function representing an approximation of the instantaneous weighting function during a radar pulse interval. This adjusted function at the output of 29 is then used in the conventional manner in a side-lobe canceller loop to translate the delayed IF auxiliary channel signal in mixer 43 so that it will subtract from the delayed main channel IF signal in subtractor 44 to cancel the jamming signal. Since the weighting function f(t) and f(t−τ) are derived during a period where clutter is substantially absent, the resultant weighting signal from 29 will be devoid of any clutter components capable of cross modulation with the interference in the main channel. The output from subtractor 44 will therefore represent the main channel signal reduced in interference from the jamming source, yet containing unmodified clutter returns that can be eliminated in a conventional MTI.

As can be seen from the above description, the present invention provides a simple and effective system for providing a side-lobe canceller that is compatible with MTI. Using unique time sampled canceller circuits designed to produce cancelling weights at the beginning and end of a radar pulse period, an interpolated output can be produced representing an approximation of the instantaneous cancelling weight needed to eliminate jamming interference in the main radar channel. By sampling during periods substantially devoid of clutter, the problems with clutter modification, as in conventional cancellers, are substantially eliminated allowing use of the side-lobe canceller with an MTI in high clutter environments. In addition, by interpolating between weights, time dependent unbalance in interference cancellation caused by antenna scan is significantly reduced.

While the present invention has been described with particular reference to a radar system, it is to be understood that the teachings are equally applicable to other signal processing systems such as sonar, etc. In addition, while mixers have been specified as the translating elements throughout, it is obvious that such elements as multipliers, performing the same function,, could be used in their place. It is further noted that the technique of time sampling, storage, and interpolation as a function of time, could be instrumented in many ways with canceller systems using adaptive loops of a variety of configurations, including digital or hybrid systems in lieu of analog side-lobe canceller loops. In particular, a phase locked voltage controlled oscillator might be used in the canceller loops to provide the weighting function in lieu of the phase shifters and local oscillator 17.

Obviously many other modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. An interference suppression system for use in high clutter environments comprising:
    main channel means for receiving desired and interference signals and providing a main channel signal;
    auxiliary channel means for receiving primarily interference signals and providing an auxiliary channel signal;
    first means coupled to said main and auxiliary channel means for correlating the interference signals to produce a first weighting function;
    second means coupled to said main and auxiliary channel means for correlating the interference signals to produce a second weighting function;
    third means coupled to said first and second means for providing an instantaneous weighting function proportional to said first and second functions;
    means coupled to said providing means and said auxiliary channel means for translating an auxiliary channel signal with said instantaneous weighting function to provide a cancelling signal;
    means coupled to said translating means and said main channel means for subtracting said cancelling signal from said main channel signal to thereby reduce interference.

2. The system of claim wherein said second means comprises, a delay means coupled to said main and auxiliary channel means for delaying said channel signals by a time period $\tau$ and a means coupled to said delay means for correlating the delayed interference signals to produce said second weighting function delayed from said first function by said delay period.

3. The system of claim 2 wherein said translating means is coupled to receive said delayed auxiliary channel signal from said delay means to provide said auxiliary channel signal to be translated and wherein said subtracting means is coupled to receive said delayed main channel signal from said delay means to provide said main channel signal to be subtracted.

4. The system of claim 3 wherein said third means comprises, means for interpolating between said first and second functions over a time period equal to said delay period to provide said instantaneous weighting function over all time of said period.

5. The system of claim 4 wherein said first means and second means each include sampling means for sampling said first and second weighting functions respectively and coupled to deliver said functions to said third means.

6. The system of claim 5 wherein each of said sampling means includes, means for providing a series of pulses separated in time by a period equal to said delay period and sample and hold means for causing said weighting function to be sampled during each of said repetitive pulses and held until the next succeeding pulse.

7. The system of claim 6 wherein said means for interpolating comprises, sawtooth generator means for providing a first linear ramp upsweep and a second linear ramp downsweep, a first balanced modulator coupled to receive said first weighting function and said ramp upsweep and provide a first output, a second balanced modulator coupled to receive said second weighting function and said ramp downsweep and provide a second output and adder means for adding the first and second outputs to provide said instantaneous weighting function, said sawtooth generator means being constructed to control the magnitude of the ramp upsweep and downsweep such that the first output goes from zero to the value of said first function and said second output goes from the value of said second function to zero during the same time period.

8. The system of claim 7 further including means coupled to said sawtooth generator means for repetitively initiating said ramp upsweep and downsweep every period $\tau$ equal to said delay period.

9. The system of claim 8 wherein said first channel means includes a directional radar antenna for receiving radar returns as said desired signals along with said interference signals and wherein said auxiliary channel means includes an omnidirectional antenna for receiving said primarily interference signals.

10. The system of claim 9 wherein said initiating means initiates said generator means at a time corresponding to a radar pulse transmission and wherein said means for providing a series of pulses provides each of said pulses at a predetermined time before a radar pulse transmission.

* * * * *